United States Patent [19]
Palvölgyi

[11] Patent Number: 5,735,322
[45] Date of Patent: Apr. 7, 1998

[54] END PIECE AND NOZZLE RECEPTOR FOR A FILL PIPE OF A VEHICULAR FUEL TANK

[75] Inventor: Sandor Palvölgyi, Gleisdorf, Austria

[73] Assignee: Blau International GesmbH, Preding, Austria

[21] Appl. No.: 681,892

[22] Filed: Jul. 29, 1996

[30] Foreign Application Priority Data

Aug. 1, 1995 [AT] Austria ..................... 1313/95

[51] Int. Cl.⁶ ............................................. B65B 1/04
[52] U.S. Cl. ..................... 141/386; 141/301; 141/350; 220/86.2
[58] Field of Search ..................... 141/350, 383, 141/386, 301; 220/86.2

[56] References Cited

U.S. PATENT DOCUMENTS

| | | | |
|---|---|---|---|
| 3,942,564 | 3/1976 | Nakazato | 220/86.2 |
| 4,079,952 | 3/1978 | Nishio et al. | 220/86.2 |
| 4,185,844 | 1/1980 | Hubbard et al. | 220/86.2 |
| 4,248,279 | 2/1981 | Warmbold | 220/86.2 |
| 4,573,694 | 3/1986 | Goto et al. | 220/86.2 |
| 4,759,458 | 7/1988 | Fischer | 220/86.2 |

FOREIGN PATENT DOCUMENTS

| | | |
|---|---|---|
| 245 613 | 11/1987 | European Pat. Off. . |
| 248 673 | 12/1987 | European Pat. Off. . |
| 311 756 | 4/1989 | European Pat. Off. . |

Primary Examiner—Renee S. Luebke
Assistant Examiner—Steven O. Douglas
Attorney, Agent, or Firm—Frishauf, Holtz, Goodman, Langer & Chick, P.C.

[57] ABSTRACT

To form an easily manufactured and installed end piece and nozzle receptor (1) for a fill pipe of a fuel tank of a motor vehicle, adapted to receive a fuel dispensing nozzle (14) of a specific type, for example for lead-free gasoline, the nozzle receptor is a single, unitary element (1) of electrically conductive sheet metal, preferably aluminum or stainless steel. It is formed with an inner thread (5) to receive a fuel cap and, just beyond, formed with an extended sealing flange (6), adapted to fit, sealingly, against an end portion (8) of the fill pipe (4). The seal can be obtained, for example, by welding the fill pipe and the nozzle receptor, preferably along a welding bead (7). A circumferential apron (9) extends from the flange (6), the apron having a height varying along its circumference so that it can fit against the body or chassis (11) of the motor vehicle, and be attached thereto along a laterally projecting attachment flange (10). The nozzle receptor has a tubular portion (2) which, at its inner end, is formed with a constricted opening (13) to permit reception only of the special-type fuel dispensing nozzle (14). A lateral opening (19) is cut in the wall of the tubular portion and the tube wall material bent outwardly in form of a tab (18) to provide an attachment element for a resiliently biassed, selectively movable valve flap (15).

20 Claims, 2 Drawing Sheets

END PIECE AND NOZZLE RECEPTOR FOR A FILL PIPE OF A VEHICULAR FUEL TANK

FIELD OF THE INVENTION

The present invention relates to a nozzle receptor or end piece which can receive a nozzle to introduce fuel into the fuel pipe of a fuel tank of a motor vehicle, and more particularly to such an end piece which can be easily manufactured, which is galvanically connected to the motor vehicle, and which can be readily designed to receive only nozzles of gasoline pumps dispensing lead-free gasoline only.

BACKGROUND

An end piece to receive a dispensing nozzle for gasoline is described, for example, in European Patent Publication 311 756, Götz et al. This end piece is constructed by a plurality of axially engaging ring segments which, in part, overlap. Sealing between the insert and the fuel pipe leading to the tank is obtained by elastic sealing rings which are placed on the insert, under tension. Axial location of the insert together with the sealing ring on the fuel pipe is obtained for forceful insertion under compressed air, the sealing ring being formed with ridges and grooves to ensure an interengaging fit with the fill pipe. To attach the fill pipe together with the insert to the chassis of a vehicle, an additional attachment element engaging the outer circumference of the fill pipe is used. A flap of a flap valve which is located at the inner end of the insert requires additional attachment elements. This construction, as well as the manufacture of the parts, is complex, requiring time-consuming assembly, and hence is time and cost-intensive.

It is a legal and safety requirement that all components of the vehicle which may touch the dispensing nozzle are electrically conductively connected with the body or the chassis of the vehicle in order to eliminate danger of an electrostatic discharge. End pieces which are made of plastic thus must be supplied with additional grounding rings at their interior circumference. This further increases the cost and complexity of manufacture as well as of assembly of filling end pieces and nozzle receptors.

THE INVENTION

It is an object to provide an end piece and nozzle adapter for a fill pipe of a fuel tank of a motor vehicle which is simple to make, provides for positive galvanic electrical connection of a fuel dispensing nozzle to the body or the chassis of the vehicle, and which is easy to manufacture, assemble, and attach to a motor vehicle.

Briefly, the end piece and nozzle adapter is a single, unitary element, for example a deep-drawn sheet-metal tubular element made of aluminum or stainless steel, which has a tubular portion and, at one end, is formed with a sealing flange, adapted to be sealingly connected, for example by welding, brazing, soldering or the like, with an end portion of the fill pipe leading to the fuel tank. The nozzle receptor is formed to receive a closure cap, and engage therewith, for example by being formed with threads to receive a threaded cap, or with other suitable arrangement for caps having a bayonet-type connection. The fuel cap engagement connection is located at an inner circumference of the tubular portion of the nozzle adapter, in the vicinity of the sealing flange.

The sealing flange is extended, in axial direction, by a circumferential apron which, in turn, is formed with an attachment flange for attaching the apron to the chassis of a motor vehicle, for example by screws or rivets. The walls of the circumferential apron have a height which varies circumferentially, so that the attachment flange can be readily secured to the usually inclined adjacent wall of the body of the motor vehicle.

The inner end of the tubular portion of the nozzle receptor, that is, the end remote from the sealing flange, is formed with a constricted opening; a lateral opening is formed, in turn, in the tubular portion close to the constricted opening. An attachment arrangement for a valve flap is provided in or on the tubular portion close to the lateral opening, for example by elements punched from the tubular portion, thereby defining the lateral opening and at the same time providing an attachment bracket, tab or projection for the valve flap.

The nozzle receptor is substantially simpler, and hence more economical than prior art structures. Additionally, it provides inherently attachment or interface positions for direct connection to the fuel fill pipe leading to the tank of the motor vehicle as well as an arrangement to receive the fuel filler cap, a connection to the chassis or the body of the vehicle, and also an attachment connection for the flap of a flap valve.

The nozzle receptor, forming an essentially cup or pot-shaped tubular structure of sheet metal, without a bottom, combines, in one single, unitary element, all required attachment portions for the fill pipe, closure, attachment to the vehicle body, as well as a flap valve to ensure that only nozzles for specific fuels, e.g. lead-free gasoline, can be passed through the nozzle adapter. At the same time, all electrically conductive functions are combined in the structure which is a single, unitary element not requiring assembly of separate parts.

In accordance with a preferred feature of the invention, the sealing flange is formed with a ridge or bead directed towards a facing side of the fill pipe in order to ensure that any static electricity build-up will be reliably discharged and, additionally, to facilitate weld connection between the nozzle receptor insert and the fill pipe.

Preferably, the height of the surrounding apron which extends from the sealing flange is matched to the shape of the body of the vehicle and varies with respect to its circumference, in accordance with the position in the vehicle. This, then, easily permits positioning of the nozzle receptor with respect to the chassis and the body of the vehicle.

The flap of the valve flap can easily and simply be attached to the nozzle receptor by making a cut in the wall of the receptor and bending out a tab where the cut was made. The opening which is thus formed in the wall of the receptor tube simultaneously forms a vent opening for the nozzle receptor and also a vent opening for the fill tube, the tab providing for attachment of the flap of the valve.

Preferably, the nozzle receptor is made by deep-drawing, utilizing sheet metal, preferably aluminum or stainless steel. This permits manufacture of the nozzle adapter as a single, unitary element in a simple manufacturing step.

DRAWINGS

DETAILED DESCRIPTION

Figure 1:
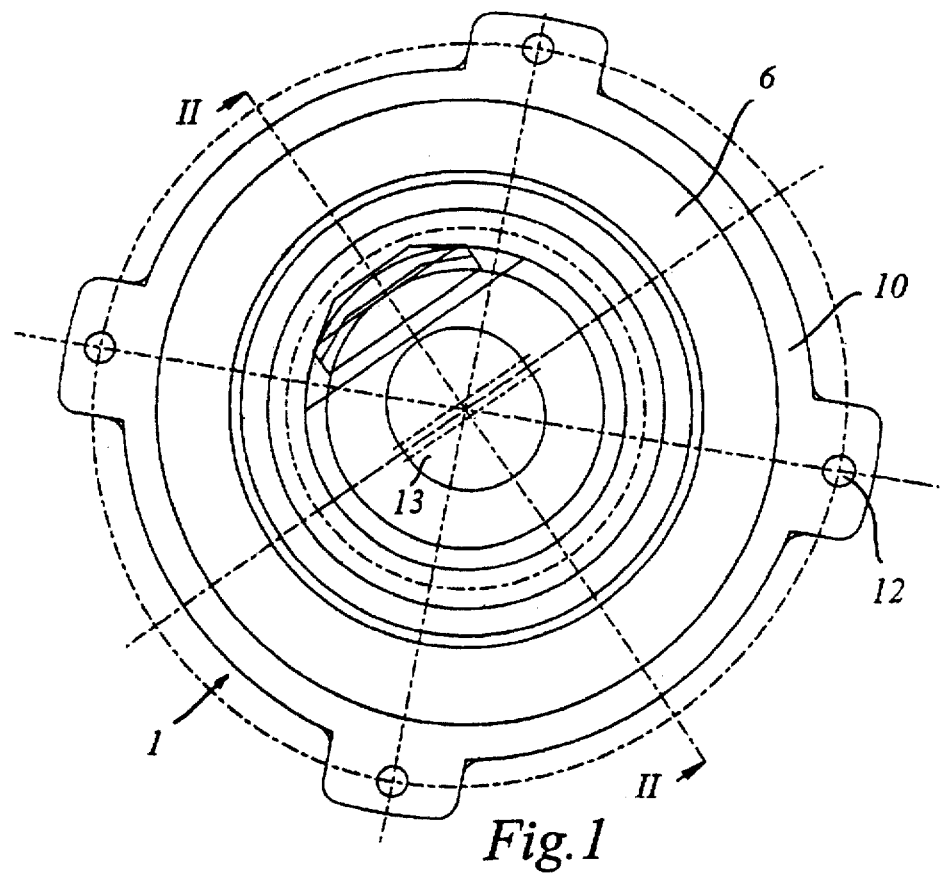
FIG. 1 is a top view of the nozzle adapter.
Figure 2:
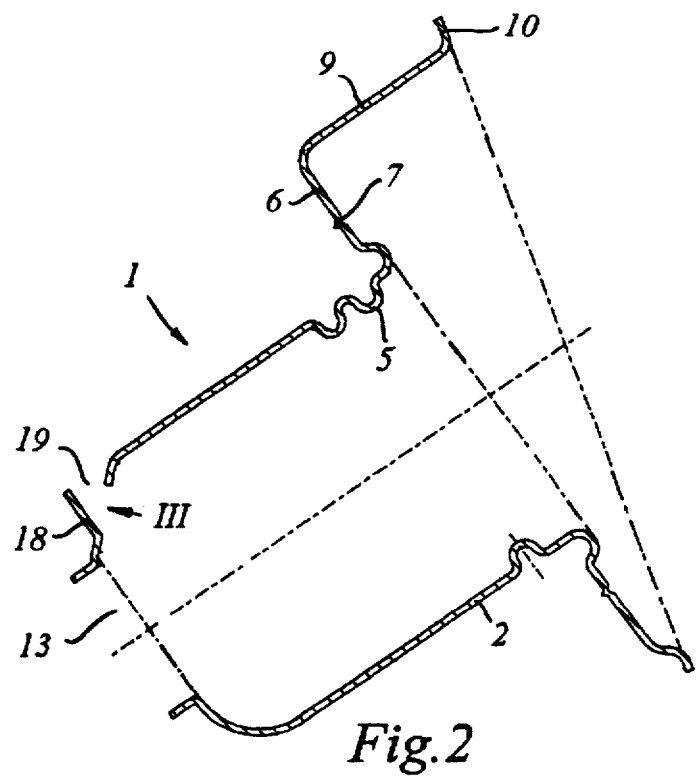
FIG. 2 is a cross section along line II—II of FIG. 1.
Figure 3:
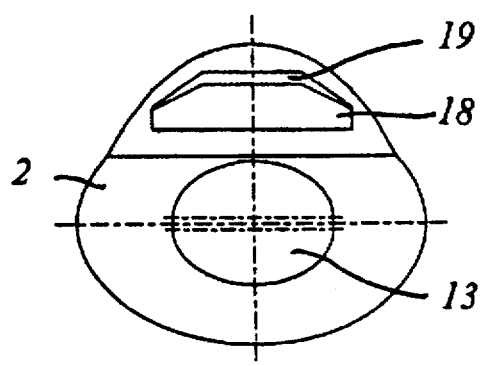
FIG. 3 is a detailed view in the direction of the arrow III in FIG. 2.

The end piece and nozzle adapter 1, illustrated in FIGS. 1-4, is a single, unitary element made of a single sheet-metal part by deep-drawing. The material is, preferably, aluminum sheet metal or sheet metal of stainless steel. Rather than using a deep-drawing process, other pressure forming and metal forming operations may be used.

The nozzle receptor 1 forms an insert into a fill pipe 4, shown only in fragmentary representation, leading to the fuel tank of a motor vehicle. It has a tubular portion 2 which is set into the enlarged opening 3 of the fill pipe 4. The other end of the fill pipe 4, not shown, leads to the fuel tank of the vehicle.

An inner thread 5 is formed at the upper end of the tubular portion 2 of the insert 1 for engagement with a fuel cap—not shown. The thread 5 is directly formed in the wall of the portion 2. Rather than using a thread, any type of interengagement arrangement may be provided, for example holding grooves or projections, or a bayonet-type connection, in dependence on the fuel cap to close off the inlet for the fuel which is to be used with the nozzle receptor.

Figure 4:
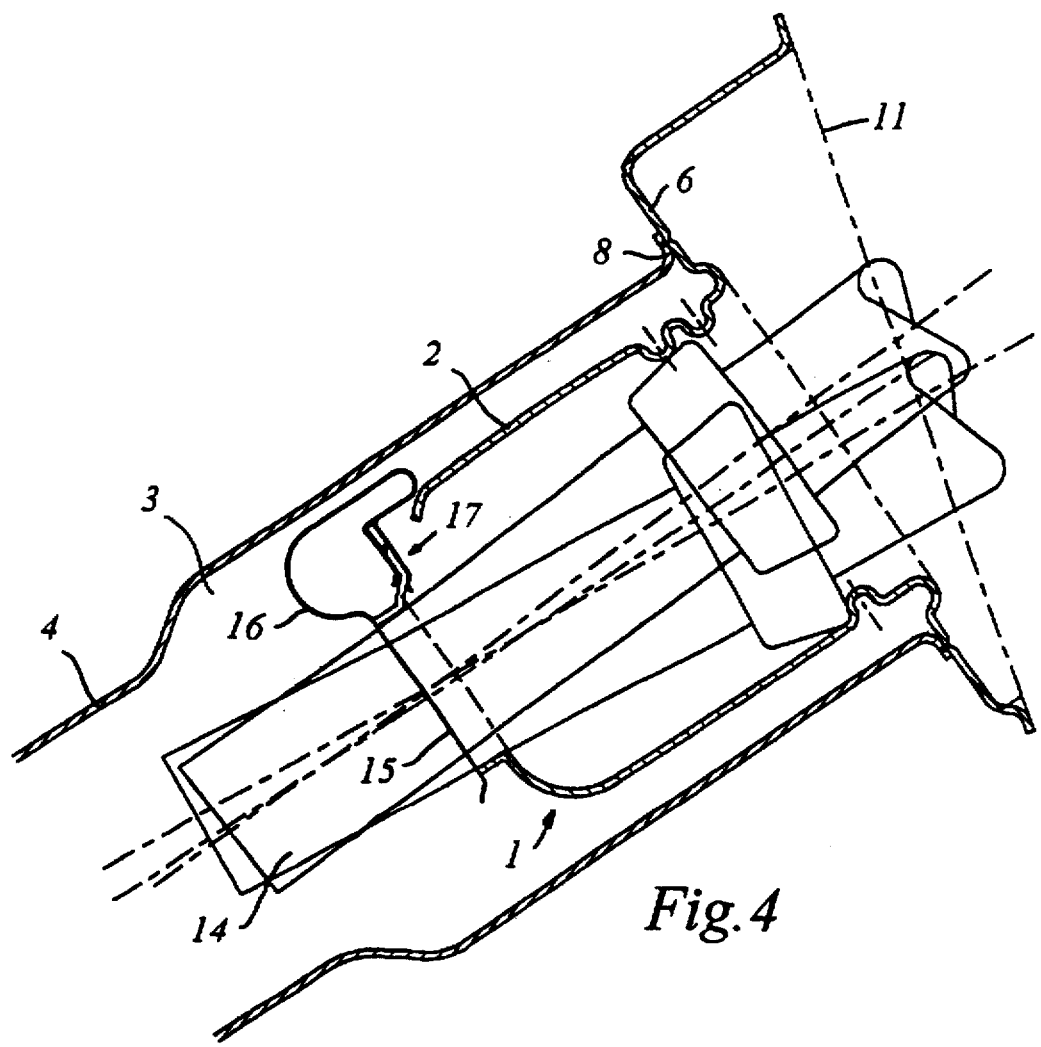
FIG. 4 is the nozzle adapter in cross section, showing, in fragmentary representation, the fill pipe for the tank, and an inserted dispensing nozzle, in which the dispensing nozzle is illustrated in two operating positions.

The tubular portion 2 of the receptor 1 is expanded above the thread 5 to a sealing flange 6. In accordance with a preferred feature of the invention, the sealing flange 6 is formed with a downwardly facing metal-to-metal connection surface, which may include a bead or rib 7 which engages a facing side 8 of the fill pipe 4 and which permits capacitor discharge as well as formation of a bead ring weld seam between the nozzle adapter 1 and the fill pipe 4—see FIG. 4. Alternatively, the sealing flange 6 can be secured to the end face 8 of the fill pipe 4 by laser welding, brazing, or any other type of weld or solder connection. Some such connections, for example laser welding or brazing, do not require the ridge or bead 7. As best seen in FIG. 4, end portion of the fill pipe 4 is slightly enlarged by forming a bent-over rolled end face 8, to which the sealing flange 6 can be easily secured; such a slight widening, however, is not a necessary requirement.

The outer circumference of the sealing flange 5 has a circumferential apron 9 formed thereon, extending essentially axially from the sealing flange 6. The apron 9 terminates at its outer end in an attachment flange 10 which can be connected to a suitable part of the vehicle body or vehicle chassis, shown schematically by the broken line 11. The height of the circumferential apron 9 varies about its circumference in accordance with the position of the fuel fill pipe 4 with respect to the body and/or chassis of the vehicle—see also FIGS. 2 and 4. The attachment flange 10 is formed with openings 12 to permit screw or rivet or similar connection to the body or chassis of the vehicle.

The lower end of the tubular portion 2 of the insert 1 is formed with an opening 13 of constricted diameter to permit only passage of a fuel dispensing nozzle 14 for lead-free gasoline. The opening 13, when not penetrated by the nozzle 14, is closed off by a resiliently pivoted flap 15 forming a cover or valve which, in the example shown, is made of spring steel and secured at one end at an attachment 17 by means of a spring loop 16. The attachment 17 is integral with and formed on the tubular portion 2 of the nozzle receptor 1. The attachment 17 is preferably formed by a tab 18, cut out or punched out from the wall of the tubular portion 2 and bent outwardly from the plane of the wall thereof, see FIG. 3. The end of the spring loop 16 is fork-shaped, and is merely pinned on or plugged on the tab 18. The opening 19 which is formed in the wall of the portion 2 by the bent-out tab 18 simultaneously forms a vent opening for the fill pipe 4 and/or the nozzle receptor 1.

Any different type of valve or flap cover, as well known in the fuel dispensing field, can be used rather than the flap 15 made of spring steel. For example, a rigid flap, resiliently pivoted on a special adapter part, and attached to the tubular portion 2, may be used. The opening, cut-out or deformation of the wall of the tubular portion 2 of the nozzle receptor 1 must then be suitably formed to receive the adapter.

Various changes and modifications may be made within the scope of the inventive concept.

I claim:

1. End piece and nozzle receptor for a fill pipe (4) to a fuel tank of a motor vehicle, comprising a single, unitary element (1) of electrically conductive sheet metal having a tubular portion (2) and being formed with a sealing flange (6) at one end thereof, which flange is adapted for electrically conductive, tight, sealed, weldable, brazeable or solderable connection with an end portion of the fill pipe (4) and defines a metal-to-metal connecting ring surface (7) for welding, brazing or soldering said element (1) to the end portion (8) of the fill pipe (4);

fuel cap engagement means (5), optionally a thread, for selective, removable engagement of a fuel cap with said end piece and nozzle receptor (1), located at an inner surface of the tubular portion in the vicinity of the sealing flange;

a circumferential apron (9) unitarily formed on the sealing flange (6) and extending generally axially from the sealing flange (6);

at least one laterally extending attachment projection (10) extending from said apron, for engagement with a chassis or body (11) of the motor vehicle;

said tubular portion (2) having a constricted opening (13) at an end remote from the sealing flange (6) for reception of a fuel nozzle (14) to fill fuel into the tank;

a valve flap (15) to selectively close the tubular portion (2), located adjacent said constricted opening (13) on the tubular portion (2); and attachment means (17) for said valve flap (15) formed on said tubular portion (2) adjacent said constricted opening (13).

2. The end piece and nozzle receptor of claim 1, wherein said metal-to-metal connecting ring surface comprises a bead or ridge (7) formed on the sealing flange (6) and facing an end surface (8) of the fill pipe (4).

3. The end piece and nozzle receptor of claim 1, wherein the height of the circumferential apron (9) varies circumferentially in accordance with the relative position of the sealing flange (6) with respect to the chassis or body (11) of the motor vehicle.

4. The end piece and nozzle receptor of claim 1, further including a tab (18) forming said attachment means (17) for the valve flap (15) extending outwardly from the wall of the tubular portion (2).

5. The end piece and nozzle receptor of claim 4, wherein the tab (18) is cut and bent out from the wall of the tubular portion and leaves an opening (19) in the wall of the tubular portion, said opening forming a vent opening for the fill pipe (4).

6. The end piece and nozzle receptor of claim 1, wherein said single, unitary element (1) comprises a deep-drawn sheet-metal element.

7. The end piece and nozzle receptor of claim 6, wherein said sheet-metal element (1) is made of aluminum or stainless steel.

8. The end piece and nozzle receptor of claim 1, wherein said single, unitary element (1) is made of aluminum or stainless steel.

9. The end piece and nozzle receptor of claim 1, wherein said at least one laterally extending attachment projection comprises an attachment flange (10).

10. The end piece and nozzle receptor of claim 1, in combination with a fill pipe (4) having a radially extending rim (8);

and wherein said sealing flange (6) is sealingly and electrically conductively joined to said rim (8).

11. The end piece and nozzle receptor of claim 10, wherein said sealing flange (6) and said rim (8) are joined by welding, brazing or soldering.

12. The end piece and nozzle receptor of claim 11, further including a bead or ridge (7) formed on the sealing flange (6) and facing an end surface (8) of the fill pipe (4);

and wherein said rim or bead (7) forms a welding or brazing bead.

13. The end piece and nozzle receptor of claim 12, wherein the height of the circumferential apron (9) varies circumferentially in accordance with the relative position of the sealing flange (6) with respect to the chassis or body (11) of the motor vehicle.

14. The end piece and nozzle receptor of claim 1, including a lateral opening (19) formed in the tubular portion (2) adjacent the constricted opening (13).

15. The combination of a fill pipe (4) leading to a fuel tank of a motor vehicle with an end piece and nozzle receptor (1) for said fill pipe adapted to be electrically conductively connected and tightly sealed to an end portion of said fill pipe (4), said end piece and nozzle receptor comprising a single, unitary element (1) of electrically conductive sheet metal having a tubular portion (2) and being formed with a sealing flange (6) at one end thereof, which flange is adapted for electrically conductive, tight, sealed, weldable, brazeable or solderable connection with an end portion of the fill pipe (4) and defines a metal-to-metal connecting ring surface (7) for welding, brazing or soldering said element (1) to the end portion (8) of the fill pipe (4);

fuel cap engagement means (5), optionally a thread, for selective, removable engagement of a fuel cap with said end piece and nozzle receptor (1), located at an inner surface of the tubular portion in the vicinity of the sealing flange;

a circumferential apron (9) unitarily formed on the sealing flange (6) and extending generally axially from the sealing flange (6);

at least one laterally extending attachment projection (10) extending from said apron, for engagement with a chassis or body (11) of the motor vehicle;

said tubular portion (2) having a constricted opening (13) at an end remote from the sealing flange (6) for reception of a fuel nozzle (14) to fill fuel into the tank;

a valve flap (15) to selectively close the tubular portion (2), located adjacent said constricted opening (13) on the tubular portion (2); and attachment means (17) for said valve flap (15) formed on said tubular portion (2) adjacent said constricted opening (13).

16. The combination of claim 15, wherein said fill pipe (4) is formed, at said end portion, with a radially extending rim for connection to said metal-to-metal connecting ring surface (7) of the single, unitary element.

17. The combination of claim 15, wherein said metal-to-metal connecting ring surface comprises a bead or ridge (7) formed on the sealing flange (6) and facing an end surface (8) of the fill pipe (4).

18. The combination of claim 15, wherein said metal-to-metal connecting ring surface of said single, unitary element (1) comprises a bead or ridge (7) formed on the sealing flange (6) and facing an end surface (8) of said fill piple (4); and wherein said fill pipe (4) is formed, at said end portion, with a radially extending rim for connection to said metal-to-metal connecting ring surface (7) of the single, unitary element.

19. The combination of claim 15, wherein said single, unitary element (1) comprises a deep-drawn sheet-metal element.

20. The combination of claim 15, further including a tab (18) forming said attachment means (17) for the valve flap (15) extending outwardly from the wall of the tubular portion (2); and wherein the tab (18) is cut and bent out from the wall of the tubular portion and leaves an opening (19) in the wall of the tubular portion, said opening forming a vent opening for the fill pipe (4).

* * * * *